United States Patent [19]

Nishikawa et al.

[11] Patent Number: 5,319,060

[45] Date of Patent: Jun. 7, 1994

[54] PREPARATION OF UNSATURATED EPOXY ESTER RESIN AND CARBOXYLATED UNSATURATED EPOXY ESTER RESIN AND PHOTOSENSITIVE COMPOSITION COMPRISING THE SAME

[75] Inventors: Katsue Nishikawa; Yoshichi Hagiwara, both of Kanagawa, Japan

[73] Assignee: W. R. Grace & Co.-Conn., New York, N.Y.

[21] Appl. No.: 80,944

[22] Filed: Jun. 22, 1993

Related U.S. Application Data

[62] Division of Ser. No. 794,550, Nov. 19, 1991, Pat. No. 5,281,678.

[30] Foreign Application Priority Data

Nov. 20, 1990 [JP] Japan ............................. 2-315255

[51] Int. Cl.$^5$ .............................................. C08G 65/10
[52] U.S. Cl. ...................................... 528/89; 528/112; 528/115; 525/20; 525/36; 525/531; 525/533; 525/922
[58] Field of Search ................... 525/20, 36, 531, 533, 525/922; 528/89, 112, 115

[56] References Cited

U.S. PATENT DOCUMENTS

| | | | |
|---|---|---|---|
| 3,819,551 | 6/1974 | Hokamura et al. | 524/94 |
| 3,882,187 | 5/1975 | Takiyama et al. | 525/531 |
| 4,293,672 | 10/1981 | Jackson | 525/531 |
| 4,347,343 | 8/1982 | Brewbaker | 525/531 |
| 4,357,456 | 11/1982 | Lopez et al. | 528/112 |
| 4,359,370 | 11/1982 | De La Mare et al. | 528/112 |
| 4,405,766 | 9/1983 | Bertram et al. | 525/507 |
| 4,413,105 | 11/1983 | Koenig | 525/482 |
| 4,431,782 | 2/1984 | Harris et al. | 525/922 |
| 4,933,420 | 6/1990 | Pham et al. | 525/482 |

FOREIGN PATENT DOCUMENTS

| | | |
|---|---|---|
| 107333 | 3/1974 | Japan . |
| 63-199718 | 8/1988 | Japan . |
| 54390 | 5/1989 | Japan . |

OTHER PUBLICATIONS

G. M. Kosolapof and Maierr "Organic Phosphorous Compounds" (John Wiley & Sons) pp. 342–347.

P. D. Bartnett, E. F. Fox, R. E. Davis: "Reactions of Elemental Sulfur. Cationic Effects in the Reaction of Sulfur Triphenylphosphine" J. Am. Chem. Soc. 83 pp. 103–109 (1961).

M. J. Boskin and P. B. Dinney, "Reactions of Episulfides and Epoxides with Trisubstituted Phosphines," Chemistry and Industry pp. 330–331 (1959).

Primary Examiner—John C. Bleutge
Assistant Examiner—Randy Gulakowski
Attorney, Agent, or Firm—Valerie E. Looper

[57] ABSTRACT

A method of preparing an unsaturated ester resin having improved storage stability is disclosed. An epoxy compound and polymerizable unsaturated monocarboxylic acid are reacted in the presence of a trivalent organic phosphorous catalyst. The catalyst is subsequently deactivated by oxidation. The resin may then be reacted with an acid anhydride.

14 Claims, No Drawings

PREPARATION OF UNSATURATED EPOXY ESTER RESIN AND CARBOXYLATED UNSATURATED EPOXY ESTER RESIN AND PHOTOSENSITIVE COMPOSITION COMPRISING THE SAME

TECHNICAL FIELD

This application is a division of Ser. No. 07/794,550 filed on Nov. 19, 1991 now U.S. Pat. No. 5,281,678.

This invention relates to an epoxy ester resin that can be widely utilized as sealant or adhesive in electronic parts and so on and as resist materials for the production of printed circuit boards, and the preparation method of such unsaturated epoxy ester resin.

BACKGROUND ART

Unsaturated epoxy ester resins, or epoxy acrylates, are widely used as various coating materials and structural materials because of their outstanding chemical resistance, water resistance and mechanical properties. Such unsaturated epoxy ester resins are usually produced by esterifying an epoxy compound with a polymerizable unsaturated carboxylic acid in the presence of a catalyst and are often used in combination with a photopolymerization initiator as a photosensitive resin. Improved properties such as adhesiveness, thermal resistance, photocurability and, at the same time, heat-curability can be imparted to the resin by further incorporating an epoxy resin and its curing catalyst therein to prepare a photosensitive composition.

However, when this photosensitive composition is employed as an image-forming material such as a resist material for preparing a printed circuit board, an organic solvent is usually necessary for the development step, which results in an environmental problem of handling the organic solvent.

Recently, in order to avoid this problem, a carboxylated unsaturated epoxy ester resin which is soluble in an aqueous alkaline solution due to the presence of the carboxyl group in its molecule has been prepared by reacting the hydroxyl group in the unsaturated epoxy ester resin as described above and an acid anhydride to introduce a carboxyl group therein. Further, when an epoxy compound and its curing catalyst are added to this carboxylated unsaturated epoxy ester resin, not only the development with an aqueous alkaline solution is possible, but also, in addition to water-resistance, adhesiveness and thermal resistance can be advantageously imparted by heat treatment after the development.

However, the widely used photosensitive resin compositions, comprising an unsaturated epoxy ester and an epoxy resin plus an epoxy curing agent such as a polycarboxylic acid, or comprising a carboxylated unsaturated epoxy ester resin plus an epoxy resin, contain a residual catalyst. This catalyst is used for the synthesis of the unsaturated epoxy ester by reaction of an epoxy compound and an unsaturated monocarboxylic acid. Even without particular addition of a catalyst, a curing reaction between the epoxy group and its curing agent will proceed slowly and gradually. This formulation therefore has a flaw of having little storage stability. For this reason, these photosensitive resin compositions are being offered for sale as a two component type composition where the epoxy resin component and polyvalent carboxylic acid component are supplied separately.

To solve this problem, the amine compound which could act as a curing catalyst is removed by washing the unsaturated epoxy ester resin after its synthesis with an aqueous acidic solution. However, this process which requires a longer period of time and a drying step is disadvantageously complicated and high in cost.

SUMMARY OF THE INVENTION

A method of preparing an unsaturated epoxy ester resin in accordance with the invention comprises reacting an epoxy compound and a polymerizable unsaturated monocarboxylic acid at a mol ratio of the carboxyl group in said polymerizable unsaturated monocarboxylic acid to the epoxy group in said epoxy compound of 0.1 to 1.2 in the presence of a trivalent organic phosphorus compound as the catalyst and deactivating said trivalent phosphorus compound by oxidation after completion of the reaction to give an unsaturated epoxy ester resin substantially free of the catalyst capable of promoting the reaction between epoxy groups and carboxyl groups.

The present invention includes an unsaturated epoxy ester resin substantially free of the previously used catalyst, which would otherwise be capable of promoting the unwanted reaction between epoxy groups and carboxyl groups.

In another aspect of the present invention, a method of preparing a carboxylated unsaturated epoxy ester resin comprises the steps of:

(a) reacting an epoxy compound and polymerizable unsaturated monocarboxylic acid at a mol ratio of the carboxylic group in said polymerizable unsaturated monocarboxylic acid to the epoxy group in said epoxy compound of 0.1 to 1.2 in the presence of a trivalent organic phosphorus compound as the catalyst to give an unsaturated epoxy ester resin;

(b) reacting said unsaturated epoxy ester resin and a polycarboxylic acid anhydride; and (c) deactivating said trivalent organic phosphorus compound by oxidation after completion of the reaction in step (a) or step (b).

The present invention also includes a carboxylated unsaturated epoxy ester resin substantially free of the previously used catalyst.

In still another aspect of the invention, a photosensitive composition comprises an unsaturated epoxy ester resin substantially free of the catalyst used in the earlier reaction step.

In a further aspect of the invention a photosensitive composition comprises a carboxylated unsaturated epoxy ester resin substantially free of catalyst residue.

Examples of the epoxy compound having one or more epoxy groups in the molecule which can be employed in the preparation of the unsaturated epoxy ester resin of the present invention include glycidyl ether type epoxy resins represented by bisphenol A type epoxy resins, glycidyl esters of polycarboxylic acids, glycidyl amine type epoxy resins, linear aliphatic epoxy resins, alicyclic epoxy resins, and Novolak type epoxy resins. Of these epoxy resins, the epoxy resins having two or more epoxy groups and aromatic rings in the molecule are preferred to improve the properties of the cured product. If necessary or desired, the epoxy resins may be used in combination.

Examples of the polymerizable unsaturated monocarboxylic acids which are compounds having an ethylenically unsaturated carboxyl group in the molecule include acrylic acid, methacrylic acid, crotonic acid and cinnamic acid. If necessary or desired, other monocarboxylic acids may be used together for the purpose of regulating the molecular weight of the unsaturated epoxy ester resin, regulating the polymerization reactivity, or improvement of the properties of the resin after curing such as flexibility, bondability, heat resistance and fire retardancy. Examples of suitable carboxylic acids include aliphatic monocarboxylic acids such as acetic acid, propionic acid, butyric acid, isobutyric acid, lauric acid, myristic acid, palmitic acid and stearic acid; and aromatic monocarboxylic acids such as toluic acid and naphthoic acid.

The mol ratio of the carboxyl group in the polymerizable unsaturated monocarboxylic acid to the epoxy group in the epoxy compound which can be employed in the preparation of the unsaturated epoxy ester resin in the present invention is typically 0.1 to 1.2, preferably 0.3 to 1.0. When the mol ratio is lower than 0.1, photocurability deteriorates. Also, when the mol ratio is higher than 1.2, the properties of the cured product deteriorate and the problems of obnoxious odor and skin irritability arise.

When the mol ratio of the carboxyl group in the polymerizable unsaturated monocarboxylic acid to the epoxy group in the epoxy compound is 1 or more than 1 to 1.2, the amount of the remaining epoxy group in the resulting unsaturated epoxy ester resin is negligible. Thus, when a photosensitive composition is prepared by using such an unsaturated epoxy ester resin or the carboxylated unsaturated epoxy ester resin obtained by further reacting the unsaturated epoxy ester and an acid anhydride in the present invention, at least one epoxy compound is incorporated in the photosensitive composition.

On the other hand, when the mol ratio of the carboxyl group to the epoxy group is less than 1, especially less than 0.7 to 0.1, enough unreacted epoxy groups remain in the resulting resins to initiate heat curing. Thus, addition of a further epoxy compound to the photosensitive composition is not necessarily required.

The reaction of the epoxy compound and the polymerizable unsaturated monocarboxylic acid to prepare the unsaturated epoxy ester resin of this invention can be carried out in the presence of a trivalent organic phosphorus compound as the catalyst under the conventional reaction conditions. The reaction is typically carried out at a temperature of 50° C. to 150° C., preferably 70° C. to 120° C. under heating to complete the reaction of the epoxy group and the carboxyl group.

In this reaction a conventional thermal polymerization inhibitor such as a quinone, phenol, a polyhydric phenol, or a nitro compound is preferably employed for the purpose of preventing the polymerization of the double bond.

The amount of the thermal polymerization inhibitor which can be employed is typically 0.001 to 1% by weight, preferably 0.005 to 0.1% by weight based on the total weight of the epoxy compound and the polymerizable unsaturated monocarboxylic acid. When the amount of the thermal polymerization inhibitor is less than 0.001% by weight, the polymerization of the unsaturated double bond cannot be sufficiently prevented. On the other hand, amounts greater than 1% by weight, the photocuring of the photosensitive composition comprising the unsaturated epoxy ester resin or the carboxylated epoxy ester resin becomes insufficient.

Further, an organic solvent such as methyl ethyl ketone, toluene, ethylene glycol monoethyl ether and its derivatives and diethylene glycol monoethyl ether and its derivatives and/or an unsaturated monomer such as trimethylolpropane triacrylate may be used as a diluent for the purpose of regulating the viscosity handling of the resin. Diluent may be present during the reaction or in the formed resin with other additives known in such technology such as a plasticizer may be used during the reacting step or during storage.

The amount of the diluent which can be employed in the present invention is typically 10 to 300 parts by weight based on 100 parts by weight of the unsaturated epoxy ester resin to be synthesized.

Any trivalent organic phosphorus compound can be used as the catalyst in the preparation of the unsaturated epoxy ester resin by the reaction of an epoxy compound and an unsaturated monocarboxylic acid, as long as it can be oxidized to a pentavalent organic phosphorus compound in the presence of an oxidizing agent at room temperature or under heating.

Exemplary trivalent organic phosphorus compounds include alkylphosphines such as triethylphosphine, tri-n-propylphosphine, tri-n-butylphosphine; arylphosphines such as triphenylphosphine, tri-m-tolylphosphine and tris(2,6-dimethoxyphenyl)phosphine; and phosphorous triesters such as triphenyl phosphite, triethyl phosphite and tris(nonylphenyl)phosphite. Of these trivalent organic phosphorus compounds, triphenyl-phosphine is particularly preferred because it is comparatively stable under ordinary operation conditions and has low toxicity and can easily be oxidized into triphenylphosphine oxide in the presence of an epoxy group remaining in the epoxy ester resin or an organic peroxide. In G. M. Kosolapof and L. Maierr, "Organic Phosphorus Compound" (John Wiley & Sons), J. Am. Chem. Soc., 83, 103 (1961) and Chemistry and Industry, 330 (1959), it is disclosed that triphenylphosphine is oxidized by an oxidizing agent into triphenylphosphine oxide having no catalytic activity for the reaction of carboxylic acid and epoxy group.

Although there is no particular restriction on the amount of the trivalent organic phosphorus compound which can be employed in the present invention, it is preferred to use 0.01 to 5% by weight of the trivalent organic phosphorus compound, based on the total weight of the epoxy compound and the polymerizable unsaturated monocarboxylic acid. When the amount of the trivalent organic phosphorus compound is 0.01% by weight, the rate of the esterification reaction is too slow. Also, amounts of greater than 5% by weight disadvantageously take a longer period of time in the oxidation of the trivalent organic phosphorus compound after completion of the reaction of the epoxy compound and the polymerizable unsaturated monocarboxylic acid.

After completion of the reaction of the epoxy compound and the polymerizable unsaturated monocarboxylic acid, the trivalent organic phosphorus compound is deactivated by oxidation into a pentavalent organic phosphorus compound having no catalytic activity for the reaction of the carboxylic acid and the epoxy group. There is no particular restriction on the oxidizing agents which can be used in the present invention. Exemplary oxidizing agents include epoxy compounds; organic peroxides; organic compounds such as tricholoroacetamide, secondary and tertiary α-haloketones, α-halogenated aldehydes, mono-α-halogenated amides, halogenated phenols, 2-hydroxyethyl disulfide, N- bromoamide; inorganic oxidizing agents such as ozone, ozonides, nitrogen oxides, potassium permanganate, chromic acid, mercuric oxide, ferric chloride and hydrogen peroxide; and sulfur compounds such as sulfur dioxide, dimethyl sulfoxide and thiol sulfoxide.

Of these oxidizing agents, preferred are epoxy compounds, organic peroxides and hydrogen peroxide because they do not easily cause side reactions such as polymerization of the unsaturated double bond and do not damage the properties of the resin after curing.

Examples of suitable epoxy compounds for the deactivation of the trivalent organic phosphorus compounds by oxidation include glycidyl ether type epoxy resins represented by bisphenol A type epoxy resins, glycidyl esters of polyvalent carboxylic acids, glycidyl amine type epoxy resins, linear aliphatic epoxy resins, alicyclic epoxy resins, Novolak type epoxy resins; and compounds having at least one epoxy group in the molecule such as glycidyl methacrylate. And, if the epoxy group/carboxylic acid reaction mol ratio is higher than 1 during synthesis of the unsaturated epoxy ester, the oxidation reaction may be carried out by using the remaining unsaturated epoxy groups.

When the oxidation of the trivalent organic phosphorus compound is effected by the epoxy group of an epoxy compound, the unsaturated epoxy ester resin or the carboxylated epoxy ester resin of the present invention can be employed with an epoxy compound to prepare a photosensitive composition and accordingly, epoxy groups may remain in the reaction mixture solution after completion of the oxidation of the trivalent organic phosphorus compound. However, in order to efficiently complete the oxidation of the trivalent organic phosphorus compound, it is preferred to employ a mol ratio of the epoxy group to the trivalent organic phosphorus compound of 1 or more than 1.

In the present invention it is preferred to use an organic hydroperoxide which will not easily generate a radical capable of polymerizing the unsaturated double bond as the oxidizing agent for the trivalent organic phosphorus compound. Exemplary organic hydroperoxides include cumene hydroperoxide, tert-butyl hydroperoxide, diisopropylbenzene hydroperoxide, p-menthane hydroperoxide, 2,5-dimethylhexane, 2,5-dihydro peroxide and 1,1,3,3-tetramethylbutyl hydroperoxide.

The amount of the organic peroxide which can be employed is typically 0.1 to 3.0 mols, preferably 0.2 to 2.0 mols per mol of the trivalent organic phosphorus compound. When the amount of the organic peroxide is greater than 3.0 mols, the polymerization of the unsaturated double bond tends to slowly occur after completion of the reaction due to the presence of the remaining organic peroxide. Also, when the amount of the organic peroxide is less than 0.1 mol, the oxidation of the trivalent organic phosphorus compound takes a long period of time. Since the trivalent organic phosphorus compound can be oxidized by the epoxy group present in the reaction mixture and can also be slowly oxidized by the solubilized oxygen in the reaction mixture, the oxidation of the trivalent organic phosphorus compound in the present invention can be effected even at a mol ratio of the organic peroxide to the trivalent organic phosphorus compound of less than 1.

The deactivation of the trivalent organic phosphorus compound by oxidation can be carried out by preparing the unsaturated epoxy ester from an epoxy resin and a polymerizable unsaturated monocarboxylic acid in the presence of the trivalent organic phosphorus compound as the catalyst, subsequently adding an oxidizing agent to the reaction mixture solution and heating the resultant mixture solution at a temperature of 20° C. to 150° C., preferably 50° C. to 120° C. When the temperature is lower than 20° C., the reaction proceeds too slowly. On the other hand, when the temperature is higher than 150° C., the polymerization of the unsaturated double bond occurs and sometimes gelation disadvantageously occurs. Or, as described above, the deactivation of the trivalent organic phosphorus compound may be carried out by reacting the epoxy compound and the polymerizable unsaturated monocarboxylic acid at a mol ratio of the carboxylic group to the epoxy group of less than 1 to form an unsaturated epoxy ester resin having remaining the epoxy groups in its molecule and subsequently heating the reaction mixture solution at a temperature of 50° C. to 150° C., preferably 70° C. to 120° C. When the heating is carried out at a temperature higher than 150° C., the polymerization of the unsaturated double bond may unfavorably occur.

In the present invention a polycarboxylic acid anhydride can be further reacted with the unsaturated epoxy ester resin as obtained above to prepare a carboxylated unsaturated epoxy ester resin. Examples of suitable polycarboxylic acid anhydrides which can be used in the present invention include dicarboxylic anhydrides such as maleic anhydride, succinic anhydride, itaconic anhydride, phthalic anhydride, hexachloroendomethylene-tetrahydrophthalic anhydride, tetrahydrophthalic anhydride, methylhexahydrophthalic anhydride, 5-norbornene-2,3-dicarboxylic dianhydride; and polycarboxylic acid anhydrides such as trimellitic anhydride, pyromellitic anhydride and benzophenone tetracarboxylic anhydride. These acid anhydrides may be used alone or in combination of two or more of them.

It is preferred that the mol ratio of the polycarboxylic acid anhydride and the hydroxy group formed between the reaction of the epoxy group and the carboxyl group of the polymerized unsaturated monocarboxylic acid in the preparation of the unsaturated epoxy ester resin is 0.05 to 1.5. More preferably, the mol ratio is 0.1 to 1.0. When the ratio is less than 0.05, desired properties such as improved adhesiveness and solubility in an aqueous alkaline solution cannot be achieved. On the other hand, mol ratios of greater than 1.5 adversely affect the viscosity stability of the resulting carboxylated unsaturated epoxy ester resin.

The reaction of the unsaturated epoxy ester resin and polycarboxylic acid anhydride can be carried out under the conventional conditions. The reaction temperature is typically 50° C. to 120° C., preferably 70° C. to 100° C. As in the reaction of the polymerizable unsaturated carboxylic acid and the epoxy compound, additives known in the art such as a polymerization inhibitor, a diluent and a plasticizer may be added in the reaction. The types and amounts of the polymerization inhibitor, the diluent and the plasticizer which can be employed may be the same as employed in the preparation of the unsaturated epoxy ester resin.

In preparing the carboxylated unsaturated epoxy ester resin by the two step reaction as described above, the deactivation of the trivalent organic phosphorus compound by oxidation may be carried out after either the first or second reaction step. However, when the deactivation of the trivalent organic phosphorus compound by oxidation is carried out after completion of the second reaction step, gelation by the reaction of an carboxylic group and an epoxy group tends to occur and accordingly, it is preferred to carry out the deactivation after completion of the first reaction step.

The unsaturated epoxy ester resin as obtained by the method of the present invention can be used for formulating various photosensitive compositions in accordance with conventional methods. For example, if it is used as the photopolymerizable unsaturated compound component in the photosensitive resin composition described in Japanese Patent Publication (Kokai) No. 10733/1974, the result is a composition with improved viscosity stability.

Likewise, the carboxylated unsaturated epoxy ester resin as obtained by the method of the present invention can be used for formulating various photosensitive compositions, especially those developable by an aqueous alkaline solution in accordance with the conventional method. Particularly when the carboxylated unsaturated epoxy ester resin of the present invention is used as the actinic light-curable resin component obtained by reacting a reaction product from a Novolak type epoxy compound and an unsaturated carboxylic acid with a saturated or unsaturated polycarboxylic acid anhydride described, for example, in Japanese Patent Publication (Kokoku) No. 54390/1989, the resulting composition has improved viscosity stability than the case using the carboxylated unsaturated epoxy ester made in accordance with the conventional method.

Further, the resin having epoxy groups as obtained by the method of the present invention can be employed, instead of the unsaturated epoxy ester resin as described in the above described Japanese Patent Publication (Kokai) No. 107333/1984 or the resin described in the Japanese Patent Publication (Kokoku) No. 54390/1989, without any additional epoxy resins which are employed in these other documents to prepare a photosensitive composition. The invented composition has a better viscosity stability and solubility in an aqueous alkaline solution than the composition described in Japanese Patent Publication (Kokai) No. 54390/1989.

As would be clear from the above description, the resin prepared by the method of the present invention comprises carboxyl groups and epoxy groups which can impart photo-curability and, at the same time, heat curability to the photosensitive composition.

These carboxyl groups and/or epoxy groups may be introduced onto the unsaturated epoxy ester resin by the above-described method of present invention or by other methods such as by additionally incorporating a carboxyl compound or an epoxy compound into the composition. Examples of such carboxyl compounds to be additionally used for this purpose include polymers of a carboxylic acid having an unsaturated group, such as acrylic acid, cinnamic acid, crotonic acid, itaconic acid, maleic acid, fumaric acid, aconitic acid and endomethylenetetrahydrophthalic acid and copolymers of at least two kinds of such monomers and copolymers of the esters of these carboxylic acids and other acrylic monomers. These substances are used alone or as a mixture. Other examples are products formed from reaction of acid anhydride and high molecular weight compounds having active hydrogen. These include phenoxy resins, phenol resins, Novolak resins, resol resins, poly-p-vinylphenol, polyvinyl alcohol and its partially acetalized compounds, polyamines and polyanilines.

The amount of the carboxyl compound which can be employed in the photosensitive composition of the present invention is not particularly limited and is typically 5 to 300% by weight based on 100 parts by weight of the total amount of the unsaturated epoxy ester resin, the carboxylated unsaturated epoxy ester resin and/or the carboxylated unsaturated epoxy ester resin having epoxy groups.

Compounds having at least one epoxy group in the molecule can be used in the photosensitive composition of the present invention. Examples of such compounds include glycidyl ether type epoxy resins represented by bisphenol A type epoxy resins, glycidyl esters of polyvalent carboxylic acids, glycidyl amine type epoxy resins, linear aliphatic epoxy resins, alicyclic epoxy resins and Novolak epoxy resins.

The amount of the epoxy compound which can be added to the photosensitive composition of the present invention is adjusted to a mol ratio of the total carboxylic groups of the remaining carboxylic groups and the added carboxyl group in the photosensitive composition to the epoxy group of the epoxy compound of typically 0.1 to 1.5, preferably 0.5 to 1.2. When the mol ratio is greater than 1.5, the water resistance of the cured product is reduced. On the other hand, mol ratios of smaller than 0.1 worsen the heat resistance of the cured product.

At least one photopolymerizable monomer and/or an organic solvent may be included in the photosensitive composition of the present invention to regulate the viscosity, to improve the properties of the cured products. These photopolymerizable monomers and/or organic solvents may be added as the diluent either in the preparation of the unsaturated epoxy ester resin or in the preparation of the photosensitive composition. Examples of such photopolymerizable monomers include 2-hydroxyethyl acrylate, 2-hydroxypropyl acrylate, N-vinyl pyrrolidone, acryl morpholine, methoxy tetraethyleneglycol acrylate, methoxy polyethyleneglycol acrylate, poly- ethylene glycol diacrylate, N,N-dimethyl acrylamide, N-methylol acrylamide, N,N-dimethylaminopropyl acrylamide, N,N-dimethylaminoethyl acrylate, N,N-dimethylaminopropyl acrylate, melamine acrylate, or methacrylates corresponding to above-said acrylates, diethyleneglycol diacrylate, triethyleneglycol diacrylate, propylene glycol diacrylate, dipropyleneglycol diacrylate, tripropylene-glycol diacrylate, polypropyleneglycol diacrylate, phenoxyethyl acrylate, tetrahydrofurfuryl acrylate, cyclohexyl acrylate, trimethylolpropane triacrylate, glycerine diglycidyl ether diacrylate, pentaerythritol triacrylate, pentaerythritol tetracrylate, pentaerythritol pentacrylate, pentaerythritol hexacrylate, isoborneolyl acrylate, cyclopentadiene mono- or diacrylate, and the methacrylates corresponding to the above-described acrylates.

Examples of suitable organic solvents are ketones such as methylethyl ketone and cyclohexanone, aromatic hydrocarbons such as toluene and xylene, ethylene glycol monoethyl ether, diethylene glycol monoethyl ether and acetate esters such as ethyl acetate, butyl acetate, ethylene glycol monoethyl ether acetate and diethylene glycol monoethyl ether acetate.

The amount of the photopolymerizable monomer and/or the organic solvent which can be employed in the photosensitive composition is typically 5 to 300 parts by weight based on 100 parts by weight of the total amount of the unsaturated epoxy ester resin, the carboxylated unsaturated epoxy ester resin and/or the carboxylated unsaturated epoxy ester resin having epoxy groups and the photopolymerizable monomer and/or the organic solvent employed in the preparation of the unsaturated epoxy ester resin.

However, those of the above described photopolymerizable monomers or organic solvents, having a hydroxyl group capable of reacting with the acid anhydride should not be used as the diluents when an acid anhydride is employed in the preparation of the carboxylated unsaturated epoxy ester resin.

The photosensitive resin composition of this invention is usually mixed with a photopolymerization initiator for practical purposes. Examples of such photopolymerization initiators include quinones such as 2-ethylanthraquinone, 2-t-butylanthroquinone, octamethyl-anthroquinone and 1,2-benzanthroquinone; α-ketaldonyl alcohols such as benzoin, pivaloin, and acyloin ether; ethers; ketones such as α-phenylbenzoin, α,α'-diethoxyacetophenone and benzophenone, 4,4'-bisdialkyl-aminobenzophenones; and 2,4,5-triarylimidazolyl dimers. These substances can be used alone, or as a mixture of two or more than two substances.

The amount of the photopolymerization initiator which can be employed in the photosensitive composition of the present invention is typically 0.2 to 30% by weight, preferably 2 to 20% by weight based on the total weight of the resin component. Conventional polymerization inhibitors may be employed to prevent thermal polymerization during its storage.

Examples of such thermal polymerization inhibitors include hydroquinone, hydroquinone monomethyl ether, pyrogallol, t-butyl catechol and phenothiazine.

The amount of the thermal polymerization inhibitor which can be employed in the present invention is typically 0.001 to 1% by weight, preferably 0.05 to 0.1% by weight based on the total weight of the resin component.

The photosensitive compositions of the present invention may be heat-cured in the absence of a curing catalyst, but it is preferred to use a curing catalyst. Although any known curing catalyst can be used, it is preferred to use a so-called latent curing catalyst in order to optimize the characteristic features of the present invention. Examples of such curing catalysts include boron trifluoride amine complex salts, amine imides, dialkylureas and isocyanate-treated amine powder. Also, various commercially available latent curing catalysts such as NOVACURE® (a product of Asahi Kasei Kogyo K. K.) and AMICURE® (a product of Ajinomoto Co., Ltd.) can be used. Of these curing catalysts, dialkylureas which are excellent in latency and curability can be preferably employed in the present invention.

Exemplary dialkylureas include N,N-dimethylurea, N,N-diethylurea, N-phenyl-N,N'-dimethylurea, N-(4-chloro- phenyl)-N',N'-dimethylurea, 3-(3,4-dichlorophenyl)-1,1- dimethylurea, 1,1'-isophorone-bis(3,3-dimethylurea) and 1,1'-isophorone-bis(3-methyl-3-hydroxyethylurea).

The amount of the dialkylurea which can be employed in the present invention is not particularly limited and is typically 0.5 to 30% by weight, preferably 1 to 10% by weight based on the weight of the resin component in the photosensitive composition.

Known fillers such as barium sulfate, silicon oxide, talc, clay or calcium carbonate, known coloring agents such as phthalocyanine green, titanium oxide, and carbon black, a leveling agent, an agent for improving adhesion and a thixotropic gent can be added to the photosensitive composition of the present invention, if necessary or desired.

Among the photosensitive resin compositions of this invention in which the unsaturated epoxy ester resins are used, those in which the carboxylated unsaturated epoxy resin is used, in particular, can be developed with an aqueous alkaline solution without using an organic solvent after curing with actinic light. They do not have environmental pollution problem and have an advantage of being lower in cost. And, the carboxylated unsaturated epoxy ether resins obtained by reacting an acid anhydride and the unsaturated epoxy ether resin having epoxy groups obtained by reacting a carboxylic acid and an epoxy compound at the carboxylic acid-/epoxyl group mol ratio of no higher than 1 have self-curability, and the photosensitive composition using such carboxylated unsaturated epoxy ester resin does not have to be further mixed with the epoxy resin. Thus, the present invention can save the mixing step, and still produce a product which excels in alkali solubility and has high developability. Furthermore, it can result in a cured film having excellent heat resistance, and therefore it is particularly desirable.

As described above, the resin obtained by the method of the present invention does not contain the residual catalyst. Therefore, the photosensitive composition of the present invention excels in viscosity stability, even if a curable amount of epoxy groups and carboxyl groups are present in the composition. Therefore, when a latent curing catalyst is used, it will show a very high storage stability at room temperature and will easily cure when heated.

The present invention will be further explained by the examples which, however, are not intended to limit the invention. In the following examples "part" means "part by weight".

EXAMPLE 1

Preparation of Carboxylated Unsaturated Epoxy Ester Resin

EPIKOTE® ®154 (phenol Novolak type epoxy resin, a product of Yuka Shell K. K., epoxy equivalent weight: 177.7) 177.7 g (1 equivalent) was dissolved in trimethylolpropane triacrylate 368 g. Hydroquinone 1 g was added as the thermal polymerization inhibitor, and then acrylic acid 72 g (1 mol) and triphenylphosphine 1.6 g (6 mmols) were added. While blowing air into the resulting mixture, the esterification of the epoxy groups in the EPIKOTE ® 154 with the acrylic acid was carried out at 100° C. Completion of the reaction was determined by titration with an alcoholic potassium hydroxide solution using phenolphthalein as the indicator, and the point at which the acid value reached zero was considered as the end point. The reaction took 8 hours. Then, EPIKOTE ® 828 (bisphenol type epoxy resin, a product of Yuka Shell K. K., epoxy equivalent weight: 184) 1 g (5.4 mmols) was added to the reaction mixture and heated at 150° C. for one hour to oxidize the triphenylphosphine while air was being blown into the solution. Then, cis-hexahydrophthalic anhydride 155.5 g (0.75 mol) was added to the reaction mixture and heated at 80° C. for 6 hours to give an unsaturated epoxy ester having carboxyl groups introduced therein.

The content of carboxyl group in the carboxylated unsaturated epoxy ester thus obtained was 1.01 mmol/g.

EXAMPLE 2

Preparation of Carboxylated Unsaturated Epoxy Ester Resin

Epoxy resin YD-011 (bisphenol A type epoxy resin, a product of Toto Kasei K. K., epoxy equivalent weight: 491) 491 g (1 equivalent) was dissolved in trimethylolpropane triacrylate 637 g, and to the resulting solution was added p-methoxyphenol 1 g as the thermal polymerization inhibitor, and then triphenylphosphine 5.6 g and acrylic acid 72g (1 mol), and the esterification was carried out at 100° C. for 5 hours to obtain an unsaturated epoxy ester resin solution. Then, glycidyl methacrylate 3.0 g was added to the reaction mixture and heated at 120° C. for 4 hours to oxidize the triphenylphosphine.

Then, maleic anhydride 74 g (0.75 mol) was added to the reaction mixture and the resulting mixture was heated at 80° C. for 6 hours to obtain a carboxylated unsaturated epoxy ester resin solution.

The acid content of the carboxylated unsaturated epoxy ester resin solution was 0.49 mmol COOH/g.

EXAMPLE 3

Preparation of Carboxylated Unsaturated Epoxy Ester Resin Having Epoxy Groups

EPIKOTE® 154 was employed as in Example 2. 88.8 g (0.5 equivalent) was dissolved in trimethylolpropane triacrylate 144 g, and hydroquinone 0.2 g was added as the thermal polymerization inhibitor. Then, acrylic acid 18 g (0.25 mol) and triphenylphosphine 1 g were added to the mixture and heated at 100° C. for 3 hours to obtain an unsaturated epoxy ester. Later, while air was blown into the reaction mixture, it was heated at 120° C. for 4 hours, to oxidize the triphenylphosphine with the epoxy group remained in the molecule. Subsequently, cis-hexahydrophthalic anhydride 38 g (0.25 mol) was added and they were reacted at 80° C. for 11 hours to introduce the carboxyl group. The acid content of the resin solution thus obtained was 0.83 mmol COOH/g. The epoxy equivalent weight of this resin solution was determined by the conventional method and it was 1160.

EXAMPLE 4

Preparation of Carboxylated Unsaturated Epoxy Ester Resin

EPIKOTE® 154 was employed as in Example 1. 177.7 g (1 equivalent) was dissolved in ethylene glycol mono-n-butyl ether acetate 368 g. After adding p-methoxyphenol 1 g as the thermal polymerization inhibitor, methacrylic acid 98 g (1 mol) and triphenylphosphine 1.6 (6 mmols) were added, and reaction was carried out at 120° C. for 6 hours to obtain an unsaturated epoxy ester resin. After cooling this solution, hydrogen peroxide (30%) 0.7 g (6 mmols) was added and the reaction mixture was agitated at 50° C. for 1 hour to carry out the oxidation reaction. Subsequently, cis-hexahydrophthalic anhydride 155.5 g (0.75 mol) was added, and it was reacted at 80° C. for 5 hours to introduce the carboxyl groups into the molecule.

The acid content of the resin solution thus obtained was 1.00 mmol COOH/g.

EXAMPLE 5

Preparation of Carboxylated Unsaturated Epoxy Ester Resin

Epoxy resin YDCN-638P (cresol Novolak type epoxy resin, a product of Toto Kasei K. K., epoxy equivalent weight: 206) 103 g (0.5 equivalent) and p-methoxyphenol 0.1 g (0.1%) were dissolved in ethylene glycol monoethyl ether acetate 185 g, and acrylic acid 36 g (0.5 mol) and triphenylphosphine 1.4 g (1%, 5.3 mmols) Were added, and reaction Was carried out at 110° C. for 3 hours to acrylate. Subsequently, cis-hexahydrophthalic anhydride 46.2 g (0.3 mol) was added and they were reacted at 80° C. for 3 hours to obtain a carboxylated unsaturated epoxy ester resin solution. After cooling this solution, t-butyl hydroperoxide 0.45 g (5.0 mmols) was added, and reaction carried out at 50° C. for 1 hour to oxidize the triphenylphosphine.

The acid content of the resin solution thus obtained was 0.78 mmol COOH/g.

EXAMPLE 6

Preparation of Unsaturated Epoxy Ester Resin Having Epoxy Groups

EPIKOTE® 154 was employed in Example 1. 178 g (1 equivalent) was dissolved in butylethylene glycol monoethyl ether 126 g, and p-methoxyphenol 1 g was added as the thermal polymerization inhibitor. After adding acrylic acid 36 g (0.5 mol) and triphenylphosphine 2 g (7.6 mmols), the reaction was carried out at 100° C. for 2 hours. After the acid value of the solution reached zero, cumene hydroperoxide 1.4 g (9.1 mmols) was added, and they were reached at 80° C. for 3 hours to oxidize triphenylphosphine into triphenylphosphine oxide. The epoxy equivalent weight of the resin solution thus obtained was determined by the conventional method and it was 690.

EXAMPLE 7

Preparation of Unsaturated Epoxy Ester Resin

EPIKOTE® 154 was employed in Example 1. 178 g (1 equivalent) was dissolved in ethylene glycol monoethyl ether acetate 107 g and the solution thus obtained was added with acrylic acid 72 g (1 mol) and then with triphenylphosphine 2.5 g as the catalyst and phenothiazine 1 g as the thermal polymerization inhibitor. The esterification of the epoxy group in EPIKOTE® 154 with the acrylic acid was carried out at 120° C. for 2 hours. After all the acrylic acid was confirmed to be consumed by the conventional acid titration method, the reaction mixture was cooled to 25° C. and then added with cumene hydroperoxide 2.2 g (purity: 80%, 0.01 mol) and the oxidation of the triphenylphosphine to triphenylphosphine oxide was carried out at 80° C. for 3 hours while blowing air into the reaction mixture. The resin solution thus obtained was a viscous liquid and contained 80% by weight of an unsaturated epoxy ester resin and had an acid content of 0.0 mg/KOH.

COMPARTIVE EXAMPLE 1

The composition of Example 1 was used except that the triphenylphosphine was changed to 2-ethyl-4-methyl-imidazole as the catalyst to obtain an unsaturated epoxy ester by the method of Example 1. Then, without heating, it was directly carboxylated to obtain a carboxylated unsaturated epoxy ester resin solution having an acid content of 0.98 mmol COOH/g.

COMPARTIVE EXAMPLE 2

A carboxylated unsaturated epoxy ester was prepared by using the same method and the same composition as Example 4, except that the hydrogen peroxide was not employed. The acid content of the carboxylated unsaturated epoxy ester resin solution thus obtained was 0.96 mmol COOH/g.

COMPARTIVE EXAMPLE 3

EPIKOTE ® 154 was employed in Example 1. 88.8 g (0.5 equivalent) was dissolved in trimethylolpropane triacrylate 144 g. After adding hydroquinone 0.2 g, diethylamine 1 g and acrylic acid 18 g (0.25 mmol) were added to carry out acrylization. Then, cis-hexahydrophtalic anhydride 38 g (0.25 mmol) was added, and reaction was carried out at 80° C. After 3 hours, the reaction mixture gelled due to the reaction between the remaining epoxy group and the acid anhydride by the catalytic action of the amine.

COMPARTIVE EXAMPLE 4

Triethylamine 0.5 weight % was added to the unsaturated epoxy ester resin having epoxy groups as obtained in Example 6 to prepare a composition.

EPIKOTE ® 154 was mixed, as in Example 1, with each of the carboxylated unsaturated epoxy esters as obtained in Examples 1 to 2, 4 to 5 and Comparative Examples 1 and 2. The resins as obtained in Examples 3, 6 and 7 and Comparative Example 4 were used directly to examine the change in viscosity at 40° C. with the change of gel time at 100° C. Thus, storage stability was evaluated. The compositions used for the evaluation of the storage stability and the results are shown in Table 1.

| Components | Composition Amount (part) |
| --- | --- |
| Ethylene glycol monoethyl ether | 20 |
| p-Methoxyphenol (thermal polymerization inhibitor) | 0.2 |
| AEROSIL ® #380 (fine silica powder, a product of Nippon Aerosil Co., Ltd. | 3 |
| Silica | 8 |
| Phthalocyanine Green | 1 |
| AMICURE ® PN-23 (latent curing catalyst, a product of Ajinomoto Co., Ltd.) | 2 |

The above composition was blended in a three-roll mixer to prepare a photosensitive composition.

(II) Formation of Solder Resist Layer (Solder Mask) for Printed Circuit Board The photosensitive composition solution as obtained in (I) was screen-printed on one surface of a copper-lined glass epoxy laminate having circuit patterns and through-holes on its both surfaces by using a 150 mesh screen by the conventional method, dried at 80° C. for 20 minutes and then the photosensitive composition solution as employed above was screen-printed on the other surface of the laminate in the same manner as described above and dried at 80° C. for 30 minutes. Then, the both surfaces of the laminate were irradiated with ultraviolet rays of 400 mJ/cm² through a negative mask, respectively, and then a 1% (w/v) aqueous sodium carbonate solution was sprayed to the irradiated surfaces to carry out development. The laminate thus developed was heat-cured at 150° C. for 30 minutes to form a solder mask pattern. Using this solder mask, a solder float test was carried out at 260° C. for 10 seconds. No deterioration of the solder mask was observed. Thus, it met the requirement to serve as a solder mask.

TABLE 1

| Composition No. | Composition | | | Gelling Time at 100° C. (minute) | Storage Stability | | | | | |
| --- | --- | --- | --- | --- | --- | --- | --- | --- | --- | --- |
| | Resin Solution (100 g) | Acid Content (mmol/g) | Amount of Epoxy Resin (g) | | Ratio of Increase in Viscosity at 40° C. | | | | | |
| | | | | | One Day | Two Days | Three Days | Five Days | Ten Days | Fifteen Days |
| 1 | Example 1 | 1.01 | 21.5 | 230 | 1.1 | 1.3 | 1.5 | 1.6 | 1.8 | 2.0 |
| 2 | Example 2 | 0.49 | 10.4 | 90 | 1.1 | 1.3 | 1.5 | 1.6 | 2.0 | 2.4 |
| 3 | Example 3 | 0.83 | — | >300 | 1.1 | 1.2 | 1.4 | 1.7 | 2.1 | 2.2 |
| 4 | Example 4 | 1.00 | 21.3 | 120 | 1.1 | 1.2 | 1.2 | 1.5 | 1.8 | 2.5 |
| 5 | Example 5 | 0.78 | 16.6 | 82 | 1.2 | 1.2 | 1.2 | 1.5 | 1.7 | 1.9 |
| 6 | Example 6 | 0.00 | — | >300 | 1.0 | 1.0 | 1.0 | 1.2 | 1.2 | 1.2 |
| 7 | Example 7 | 0.00 | — | >300 | 1.0 | 1.0 | 1.0 | 1.0 | 1.2 | 1.2 |
| 8 | Comparative Example 1 | 0.98 | 20.9 | 55 | 1.3 | 1.8 | 2.6 | gelled | — | — |
| 9 | Comparative Example 2 | 0.96 | 20.5 | 65 | 1.3 | 1.6 | 1.6 | 1.7 | 5.9 | gelled |
| 10 | Comparative Example 4 | 0.00 | — | 48 | 1.4 | 1.4 | 1.6 | 2.1 | 2.5 | 3.0 |

EXAMPLE 8

(I) Preparation of Photosensitive Composition Solution (Photo-Solder Resist Solution)

| Components | Composition Amount (part) |
| --- | --- |
| Carboxylated unsaturated epoxy ester resin solution obtained in Example 1 | 50 |
| Epoxy resin YDCN-638 as employed in Example 5 | 13 |
| Benzophenone/Michler's ketone (weight ratio 10/1) mixture | 3 |

EXAMPLE 9

(I) Preparation of Photosensitive Composition Solution

| Components | Composition Amount (part) |
| --- | --- |
| Carboxylated unsaturated epoxy ester resin obtained in Example 3 | 15 |
| Pentaerythritol hexaacrylate | 3 |
| IRGACURE ® 907 (photopolymerization initiator, a product of Ciba-Geigy Ltd.) | 1 |

-continued

| Composition | |
|---|---|
| Components | Amount (part) |
| NOVACURE ® HX 3722 (latent curing catalyst, a product of Asahi Kasei Kogyo K.K.) | 1 |
| p-Methoxyphenol | 0.04 |
| Silver powder (average particle size: 1.2 μm) | 80 |

The components as described above was kneaded in a three-roll mixer to prepare a UV-curable conductive paste.

(II) Formation of Conductive Circuit Pattern

Using the photosensitive composition solution obtained in (I), a conductive circuit pattern was screen-printed on an alumina ceramic substrate. The pattern was irradiated with ultraviolet rays of 600 mJ/cm$^2$, and then heated at 120° C. for 20 minutes to form a silver circuit.

The specific resistivity of this silver circuit was $6 \times 10^{-4}$ Ωcm.

EXAMPLE 10

(I) Preparation of Photosensitive Composition Solution

| Composition | |
|---|---|
| Components | Amount (part) |
| Carboxylated unsaturated epoxy ester resin solution obtained in Example 2 | 40 |
| Carboxylated unsaturated epoxy ester resin solution obtained in Example 3 | 40 |
| IRGACURE ® 651 (photopolymerization initiator, a product of Ciba-Geigy Ltd.) | 5 |
| Phthalocyanine Green | 0.3 |
| Hydroquinone (thermal polymerization inhibitor) | 0.2 |
| EPIKOTE ® 154 as employed in Example 1 | 12 |
| AMICURE ® PN-23 as employed in Example 8 | 2.5 |

The components as described above were blended in a three-roll mixer to prepare a photosensitive composition solution.

(II) Formation of Solder Resist Layer (Solder Mask) for Printed Circuit Board

After the photosensitive composition solution obtained in (I) was coated on a printed circuit board having a circuit pattern by the conventional roll coating method and the coated layer was exposed to ultraviolet rays of 500 mJ/cm$^2$ through a negative mask kept 2 mm off the coated layer, and to the exposed coated layer a 1% (w/v) aqueous sodium carbonate solution was sprayed to carry out development. Subsequently, the circuit board thus developed was heat-cured at 150° C. for 30 minutes to form a solder mask pattern.

Using the solder mask, a solder float test was carried out in the same manner as in Example 6, and no deterioration of the mask was observed.

EXAMPLE 11

(I) Preparation of Photosensitive Composition Solution (Solder Resist Solution)

| Composition | |
|---|---|
| Components | Amount (part) |
| Carboxylated unsaturated epoxy ester resin solution prepared in Example 3 | 46 |
| Pentaerythritol hexaacrylate | 8.0 |
| IRGACURE ® 907 as employed in Example 9 | 5.0 |
| AMICURE ® MY-24 (latent curing catalyst, a product of Ajinomoto K.K.) | 2.5 |
| Hydroquinone | 0.5 |
| Phthalocyanine Green | 0.5 |
| Talc | 20.0 |
| AEROSIL ® #380 as employed in Example 8 | 10.0 |
| Ethylene glycol monoethyl ether acetate | 7.5 |

(II) Formation of Solder Resist Layer (Solder Mask for Printed Circuit Board)

The photosensitive resin solution as obtained in (I) was screen-printed on one surface of a copper-lined glass epoxy laminate having circuit patterns and through-holes on its both surfaces by a 150 mesh screen by the conventional method, dried at 80° C. for 20 minutes and the photosensitive composition solution as employed above was screen printed on the other surface of the laminate in the same manner as described above, and dried at 80° C. for 30 minutes. Subsequently, the both surfaces of the laminate were irradiated with ultraviolet rays of 400 mJ/cm$^2$ through a negative mask, respectively, and then a 1% (w/v) aqueous sodium carbonate solution was sprayed on the irradiated surfaces to carry out development. The laminate thus developed was heat-cured at 150° C. for 30 minutes to form a solder mask pattern. Using this solder mask, a solder float test was carried out at 260° C. for 10 seconds, but no deterioration of the mask was observed. Thus, it met the requirement to serve as the solder mask.

COMPARTIVE EXAMPLE 5

A photosensitive composition solution was prepared in the same manner as in Example 8 except that the epoxy ester resin obtained in Comparative Example 1 was employed instead of the unsaturated epoxy ester resin. In the same manner as in Example 8, a solder resist pattern was formed. Although the property as the solder resist layer was no more different from that in Example 8, the resin composition gelled after storing at 25° C. for 2 days and thus the storage stability was inferior.

EXAMPLE 12

A photosensitive composition solution (herein "composition 12") as shown below was prepared by using the carboxylated unsaturated epoxy ester resin as obtained in Example 1, a phenol Novolak type epoxy resin and trimethylolpropane triacrylate instead of the resin solution of carboxylated unsaturated epoxy ester having epoxy groups in composition 11 of Example 11 and adjusting the contents of carboxyl group and epoxy group equal to those of composition 11 of Example 11 with an independent carboxylic acid and an independent epoxy resin.

Composition 12

| Components | Amount (part) |
| --- | --- |
| Carboxylated unsaturated epoxy ester resin as obtained in Example 1 | 23 |
| EPIKOTE ® 154 as employed in Example 1 | 11.5 |
| Trimethylolpropane triacrylate | 11.5 |
| Pentaerythritol hexaacrylate | 8 |
| IRGACURE ® 907 as employed in Example 9 | 5 |
| AMICURE ® MY (latent curing catalyst, a product of Ajinomoto Co., Ltd.) | 2.5 |
| Hydroquinone | 0.5 |
| Phthalocyanine Green | 0.5 |
| Talc | 20 |
| AEROSIL ® #380 as employed in Example 8 | 10 |
| Ethylene glycol monoethyl ether | 7.5 |

The photosensitive composition solution thus obtained was screen-printed on a copper-lined glass epoxy laminate and dried in the same manner as in Example 8 to give a coating on the laminate. When the laminate thus obtained was dipped in a 1% (w/v) aqueous sodium carbonate sodium, the coating of composition 11 was completely dissolved at 25° C. in 5 minutes while composition 12 remained undissolved in many portions even after 5 minutes and accordingly, it was necessary to spray an aqueous sodium carbonate solution to the coating of composition 12 in order to completely dissolve the coating of composition 12.

EXAMPLE 13

(I) preparation of Resin Solution of Carboxylated Unsaturated Epoxy Ester Having Epoxy Groups EPIKOTE ® 154 as employed in Example 1 177.7 g (1 equivalent) was dissolved in propylene glycol monomethyl ether acetate 93 g and to the solution thus obtained was added acrylic acid 36 g (0.5 mol) and then triphenylphosphine 2 g as the catalyst and p-methoxyphenol 1 g as the thermal polymerization inhibitor. The esterification of half of the epoxy groups in the EPIKOTE ® with the acrylic acid was carried out at 100° C. for 2.5 hours while blowing air into the mixture. Then to the reaction mixture was added cumene peroxide 1.8 g. The oxidation of the triphenylphosphine to triphenylphosphine oxide was carried out at 80° C. for 5 hours while blowing air into the reaction mixture to give an unsaturated epoxy ester resin. Then, cis-hexahydrophthalic anhydride 46.2 was dissolved in propylene glycol monomethyl ether acetate 20 g and the resulting solution was added to the reaction solution as obtained above and the introduction of carboxyl groups into the unsaturated epoxy ester resin was carried out at 90° C. for 8 hours.

The resin solution thus obtained contained 70% by weight of a carboxylated unsaturated epoxy ester resin having epoxy groups and had a viscosity at 25° C. of 10,000 cps, an acid value of 44.9 mg-KOH/g and an epoxy equivalent weight of 880.

(II) Preparation of Photo-Solder Resist Solution

The following composition was kneaded in a three-roll mixer to prepare a photo-solder resist solution.

Composition

| Components | Amount (g) |
| --- | --- |
| Resin solution as obtained in (I) | 55 |
| Pentaerythritol hexaacrylate | 8 |
| Talc | 18 |
| AEROSIL ® #380 as employed in Example 8 | 2 |
| 3-(3,4-Dichlorophenyl)-1,1-dimethylurea ("DCMU 99", a product of Hodogaya Chemical Co., Ltd.) | 1 |
| Phthalocyanine Green | 1 |
| IRGACURE ® 651 as employed in Example 10 | 6 |
| SOLVESSO ® 150 (naphtha, a product of Exxon Co.) | 8 |
| SH86PA (silicone defoaming agent, a product of Toray-Dow Corning Co.) | 0.5 |

(III) Formation of Solder Resist Layer

The solder resist solution as obtained in (II) was screen-printed on one surface of a copper-lined glass epoxy laminate having circuit patterns and through-holes by using a 150 mesh screen and dried at 80° C. for 15 minutes by the conventional method. Then, the solder resist solution as employed above was screen-printed on the other surface of the laminate in the same manner as described above and dried at 80° C. for 20 minutes. Both surfaces of the laminate were irradiated with ultraviolet rays of 500 mJ/cm² through a mask, respectively, and developed by spraying a 1% (w/v) aqueous sodium carbonate solution to the irradiated surfaces at 30° C. for 30 seconds, and the laminate thus developed was subjected to heat curing at 150° C. for 40 minutes to give solder resist layers. Using these solder resist layers, soldering was carried out and no swelling and peeling of the solder resist layers were observed.

EXAMPLE 14

(I) Preparation of Photosensitive Composition Solution

The following composition was mixed to prepare a photosensitive composition solution.

Composition

| Components | Amount (part) |
| --- | --- |
| Resin solution of carboxylated unsaturated epoxy ester obtained in Example 1 | 22 |
| Copolymer of acrylic acid and methyl methacrylate having an acid value of 200 | 25 |
| Dipentaerthyritol monohydroxy pentaacrylate | 3 |
| IRGACURE ® 651 as employed in Example 10 | 3 |
| CY 179 [trade name, liquid alicyclic epoxy resin, a product of Ciba-Geigy (Japan) Ltd.] | 42 |
| Phthalocyanine Green | 2 |
| U-CAT ® 3503 N (aliphatic urea type curing promoter, a product of Sun Abbot Co.) | 2 |
| MODAFLOW ® (flow controlling agent, a product of Monsanto Co.) | 1 |

(II) Formation of Solder Resist Layer

The photosensitive composition solution as obtained in (I) was coated on a polyethylene terephalate film so as to obtain a thickness of the dried coating of 50 μm and dried at 60° C. for 15 minutes and at 80° C. for 20 minutes. Then the coating thus obtained was heat-pressed at 100° C. to the both surfaces of a copper-lined glass epoxy laminate having printed circuit patterns and through-holes, respectively. Subsequently, the both surfaces of the laminate were irradiated with ultraviolet rays of 300 mJ/cm² through a mask, respectively, and developed by spraying a 1% (w/v) aqueous sodium carbonate solution to the coatings, and the laminate thus developed was subjected to heat curing at 150° C. for 30 minutes to give solder resist layers. Using these solder resist layers a solder float test was carried out at 260° C. for 10 seconds. As a result, no deterioration of the older resist layers was observed and-the coatings met the requirement for solder resist layers . Further, the photosensitive composition as prepared in (I) did not show any change in the properties at 25° C. for 3 months and thus had a sufficient storage stability.

EXAMPLE 15

Evaluation of Storage Stability of Photosensitive Compositions

The storage stabilities at 25° C. of the photosensitive compositions as obtained in Examples 8 to 11 and 13 to 14 and Comparative Example 5 were evaluated and the results are shown in Table 2.

The developabilities of the above described photosensitive compositions were evaluated by whether or not undissolved coatings of the photosensitive compositions remained after a 1% (w/v) aqueous sodium carbonate solution was sprayed at 30° C. for 30 seconds to the coatings of the photosensitive compositions which had been formed on a copper-lined glass epoxy laminate to a thickness of 50 μm by a 150 mesh screen and dried at 80° C. for 20 minutes.

TABLE 2

| Photosensitive Composition | Possible Storage Period of Time at 25° C. (Week) | Phenomenon Observed after Elapse of Possible Storage Period of Time | |
|---|---|---|---|
| | | State of Photosensitive Composition | Abnormality at Development |
| Example 8 | 6 | Difficulty in coating due to high viscosity | Presence of residues of coating |
| Example 9 | 10 | Gelled | — |
| Example 10 | 8 | Difficulty in coating due to high viscosity | Presence of residues of coating |
| Example 11 | 12 | — | Presence of residues of coating |
| Example 12 | 11 | — | Presence of residues of coating |
| Example 13 | 14 | — | Presence of residues of coating |
| Example 14 | 11 | — | Presence of residues of coating |
| Comparative Example 5 | 1 day | Gelled | — |

What is claimed is:

1. A method of preparing a carboxylated unsaturated epoxy ester resin which comprises the steps of:
   (a) reacting an epoxy compound and a polymerizable unsaturated monocarboxylic acid at a mol ratio of carboxylic group in the unsaturated monocarboxylic acid to the epoxy group in the epoxy group of 0.1 to 1.2 in the presence of a trivalent organic phosphorus catalyst capable of promoting a reaction between an epoxy group and a carboxyl group to make an unsaturated epoxy ester resin;
   (b) reacting the unsaturated epoxy ester resin and a polycarboxylic acid anhydride; and
   (c) deactivating the trivalent organic phosphorus catalyst by oxidation after completion of the reaction in either one of step (a) or step (b); and
   (d) recovering a product substantially free of the trivalent catalyst.

2. The method of claim 1, wherein the mol ratio of the polycarboxylic acid anhydride to the hydroxyl group formed by the reaction between the epoxy group of the epoxy compound and the carboxyl group of the polymerizable unsaturated monocarboxylic acid in the preparation of the unsaturated epoxy ester resin is 0.05 to 1.5.

3. The method of claim 2, wherein step (b) is carried out at a temperature of 50° C. to 120° C. in the presence of at least one member of the group consisting of a thermal polymerization inhibitor, a diluent and a plasticizer.

4. The method of claim 1, wherein the mol ratio of the carboxyl group in the polymerizable unsaturated monocarboxylic acid to the epoxy compound in step (a) is 0.1 to less than 1.

5. The method of claim 4, wherein the mol ratio in step (a) is 0.1 to 0.7.

6. The method of claim 5, wherein step (c) is carried out after completion of the reaction in step (a).

7. The method of claim 1, wherein the mol ratio of the carboxyl group in the polymerizable unsaturated monocarboxylic acid to the epoxy compound is 1 to 1.2.

8. A photosensitive composition comprising:
   (1) a carboxylated unsaturated epoxy ester resin made by the method which comprises the steps of:
      (a) reacting an epoxy compound and a polymerizable unsaturated monocarboxylic acid at a mol ratio of carboxylic group in the unsaturated monocarboxylic acid to the epoxy group in the epoxy group of 0.1 to 1.2 in the presence of a trivalent organic phosphorus catalyst capable of promoting a reaction between an epoxy group and a carboxyl group to make an unsaturated epoxy ester resin;
      (b) reacting the unsaturated epoxy ester resin and a polycarboxylic aid anhydride; and
      (c) deactivating the trivalent organic phosphorus catalyst by oxidation after completion of the reaction in either one of step (a) or step (b); and
      (d) recovering a product substantially free of the trivalent catalyst; and
   (2) a photopolymerization initiator.

9. The photosensitive composition of claim 8 further comprising a photopolymerizable monomer.

10. The photosensitive composition of claim 8 further comprising a diluent.

11. The photosensitive composition of claim 8 further comprising a curing catalyst having latency at 25° C.

12. The photosensitive composition of claim 11, wherein the curing catalyst is an N,N-dialkylurea.

13. The photosensitive composition of claim 12, wherein the N,N-dialkylurea is an N,N-dimethylurea.

14. The photosensitive composition of claim 8 further comprising a thermal polymerization inhibitor.

* * * * *